(12) United States Patent
Jayasuriya et al.

(10) Patent No.: US 8,267,445 B1
(45) Date of Patent: Sep. 18, 2012

(54) INERTIA-LOCKING REACTIVE BUMPER FOR MOTOR VEHICLE

(75) Inventors: Mangala M. Jayasuriya, Bloomfield Hills, MI (US); James Chih Cheng, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/366,678

(22) Filed: Feb. 6, 2012

(51) Int. Cl.
*B60R 19/26* (2006.01)
(52) U.S. Cl. .................. 293/133; 293/132; 296/187.09; 180/274; 188/371
(58) Field of Classification Search ............. 296/187.09; 293/132, 133, 135, 136, 137; 180/274; 188/371
See application file for complete search history.

(56) References Cited

U.S. PATENT DOCUMENTS

| | | | |
|---|---|---|---|
| 5,443,146 A * | 8/1995 | Ayyildiz et al. ............... | 188/374 |
| 5,967,573 A | 10/1999 | Wang | |
| 6,019,419 A | 2/2000 | Browne et al. | |
| 6,050,624 A * | 4/2000 | Kim .............................. | 293/132 |
| 6,834,898 B2 | 12/2004 | Wang et al. | |
| 6,976,718 B2 | 12/2005 | Nakanishi | |
| 2011/0042975 A1 | 2/2011 | Faruque | |

OTHER PUBLICATIONS

Peter J. Schuster, California Polytechnic State University, SAE International, Current Trends in Bumper Design for Pedestrian Impact, Paper No. 2006-01-0464, 2006.
IUsedAutoParts.Com, Find Your Bumper Impact Absorber Rear Now.
Transportation Research Board, TRID, Vehicle Hood and Bumper Structure Design to Mitigate Casualities of Pedestrian Accidents, Publication Date: Jun. 2005, Last Modified: May 10, 2009.
J.T. Wang, General Motors Corporation, Untied States Paper No. 05-0144, An Extendable and Retractable Bumper.

* cited by examiner

*Primary Examiner* — Joseph Pape
(74) *Attorney, Agent, or Firm* — James Dottavio; Brooks Kushman P.C.

(57) ABSTRACT

An energy-absorbing front end structure for a motor vehicle includes a pair of frame rails, struts (crushable members) made movable relative to the frame rails along a longitudinal axis, a bumper beam supported by the struts, and a spring resisting rearward movement of each strut relative to the frame rail. An inertia-activated locking device inhibits rearward movement of the strut when the vehicle undergoes a longitudinal deceleration above a threshold level so that the strut may absorb crash energy in a high-speed collision. If the vehicle is involved in a lower energy collision, such as with a pedestrian, the deceleration experienced by the vehicle is below the threshold level and the strut remains in an unlocked condition in which it is able to move rearward against the spring to lessen the crash energy transmitted to the pedestrian.

20 Claims, 4 Drawing Sheets

INERTIA-LOCKING REACTIVE BUMPER FOR MOTOR VEHICLE

TECHNICAL FIELD

The present invention relates to a bumper for a motor vehicle, and more specifically to such a bumper that operates in one of two energy absorbing modes depending upon the level of deceleration the vehicle experiences during a collision.

BACKGROUND

Many motor vehicle front bumper systems utilize crush cans between the bumper beam and the vehicle frame. The crush cans are engineered to deform in a predictable fashion when subjected to compressive force during a relatively high-speed frontal collision in order to absorb kinetic energy. By design, the crush cans only deform when the crash/impact is of such a severity (in terms of the level of deceleration experienced by the vehicle) that other occupant safety systems alone may not be able to adequately protect the occupants.

In a collision between a motor vehicle and a pedestrian, the force applied to the vehicle bumper is usually well below that which will result in deformation of the crush cans, so that the cans offer no protection to the pedestrian. Other features or devices may be provided to reduce the likelihood and/or severity of injury experienced by a pedestrian.

Vehicle-mounted systems have been proposed using some type of sensor (contact, radar, lidar, optical, etc.) to detect and/or predict a collision with a pedestrian. When a pedestrian collision is detected or predicted, some sort of countermeasure is activated or deployed to moderate the impact experienced by the pedestrian. Such systems require complicated sensors and electromechanical systems to function properly and reliably.

SUMMARY

To solve at least one problem in the prior art, a bumper system is disclosed utilizing a deceleration-activated trigger to alternatively lock the bumper system during a high-energy collision to allow the bumper and struts (crush cans) to absorb crash energy, or allow rearward motion of the bumper beam against a spring during a low-energy collision In a disclosed embodiment of the invention, a front end structure for a vehicle comprises a frame, a strut supported by the frame for movement relative thereto along a longitudinal axis of the vehicle, a first engagement member movable relative to the strut along the longitudinal axis, and a second engagement member fixed relative to the frame rearward of the first engagement member. At least one blocking member is movable longitudinally along with the strut and is further moveable relative to the strut between a first position wherein it does not impede rearward movement of the strut relative to the first engagement member, and a second position wherein it prevents rearward movement of the strut relative to the first engagement member. When the blocking member in the second position, rearward movement of the strut urges the first engagement member into locking contact with the second engagement member. The blocking member is moved to the second position by an inertia-activated trigger mechanism that includes a mass mounted to move forward relative to the strut when the strut experiences a deceleration above a threshold level. The inertial movement of the mass activates the trigger mechanism to a locked condition wherein the trigger mechanism is locked against rearward movement relative to the frame. Continued rearward movement of the strut causes the locked trigger mechanism to urge the blocking member to the second position.

In one disclosed embodiment, the threshold is set at a level to distinguish between collisions wherein: a) the vehicle strikes a pedestrian; and b) the vehicle strikes an object substantially heavier than a pedestrian.

In another disclosed embodiment, apparatus for mounting a bumper beam to a frame of an automotive vehicle comprises a strut having a forward end adapted for attachment to the bumper beam and a rear end adapted for engagement with the frame for rearward movement relative thereto along an impact axis. A first engagement member is mounted adjacent to the strut and moveable relative thereto along the longitudinal axis, and a second engagement member is fixed relative to the frame rearward of the first engagement member. A blocking member is mounted to the strut for longitudinal movement therewith and further moveable relative to the strut between a first position wherein it does not impede rearward movement of the strut relative to the first engagement member, and a second position wherein it prevents rearward movement of the strut relative to the first engagement member. When the blocking member is in the second position, rearward movement of the strut drives the first engagement member into locking contact with the second engagement member. A mass is mounted between the strut and the frame such that deceleration of the strut above a threshold level causes an inertial movement of the mass forward relative to the strut. An actuator is locked against rearward movement relative to the frame by the inertial movement of the mass, and continued rearward movement of the strut causes the locked actuator to urge the blocking member to the second position.

In another disclosed embodiment, apparatus for selectively preventing rearward movement of a bumper beam and struts relative to a vehicle frame along a longitudinal axis of the vehicle comprises a first engagement member mounted adjacent to the strut and moveable relative thereto along the longitudinal axis, a second engagement member fixed relative to the frame rearward of the first engagement member, and a blocking member moveable relative to the strut between a first position wherein it does not impede rearward movement of the strut relative to the first engagement member and a second position wherein it prevents rearward movement of the strut relative to the first engagement member. When the rearward movement of the strut relative to the first engagement member is prevented, continued rearward movement of the strut drives the first engagement member into locking contact with the second engagement member. A mass is movably mounted relative to the strut such that impact deceleration above a threshold level applied to the strut causes an inertial movement of the mass forward relative to the strut. The inertial movement of the mass moves an actuator to a locked condition wherein it is locked against rearward movement relative to the frame. A cam is urged against the locked actuator by rearward movement of the strut after the actuator assumes the locked condition, the urging against the actuator rotating the cam about an axis normal to longitudinal axis, and the rotation of the cam urging the blocking member to the second position.

In another disclosed embodiment, a spring disposed between the strut and the frame is oriented to apply force against movement of the strut rearward relative to the impact axis. The spring serves to reduce the pulse applied to a pedestrian during a collision, and also to reset the strut and bumper to the original position after a collision in which the vehicle has sustained no damage In another disclosed embodiment, at least one of the first and second engagement members are wedge shaped.

BRIEF DESCRIPTION OF THE DRAWINGS

Embodiments of the present invention will now be described by way of example only with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The terms "automotive" and "motor vehicle", as used herein, refer to any wheeled vehicle intended for operation on or off of roadways, and includes (but is not limited to) cars, trucks (light and heavy), utility vehicles, cross-over vehicles, and construction equipment.

Figure 1:
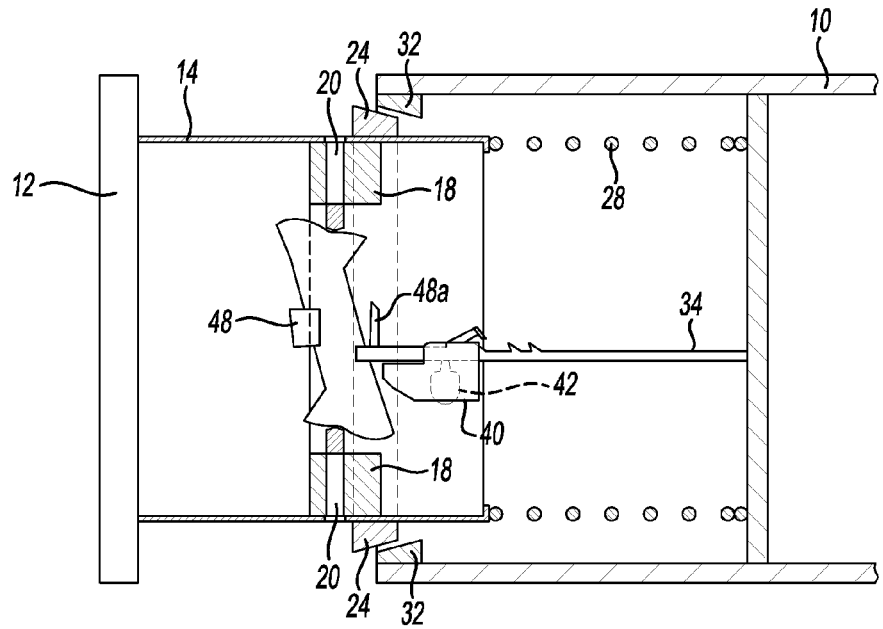
FIG. 1 is a schematic, cross-sectional view of a bumper system according to an embodiment of the invention, the bumper system in a neutral, pre-impact condition.
Figure 2:
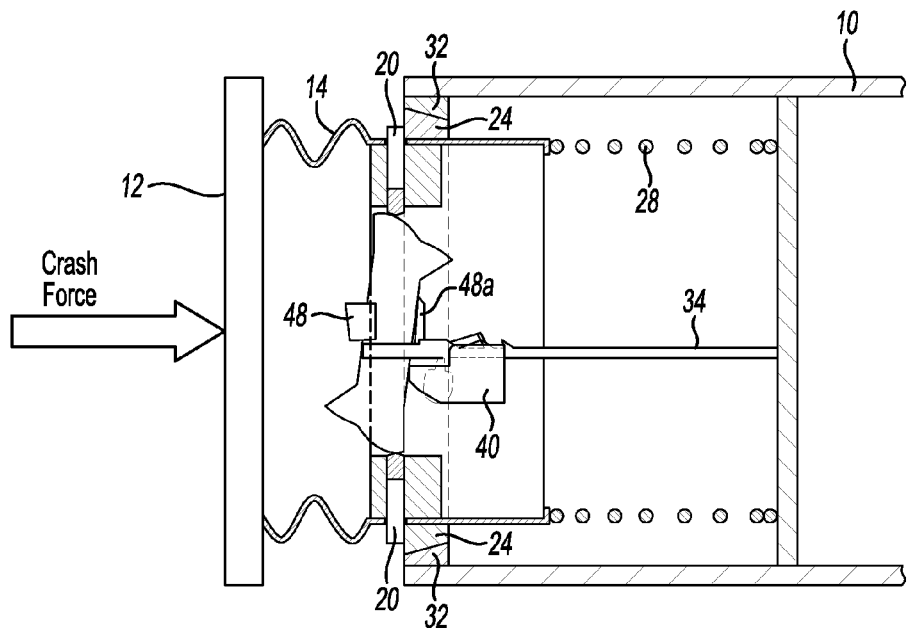
FIG. 2 is a view of the bumper system of FIG. 1 after a high energy collision which has caused the strut to be locked against rearward movement.

FIGS. 1 and 2 schematically show a forward portion of a vehicle frame rail 10 and a front bumper beam 12. Bumper beam 12 is attached to the forward end of a strut 14, and the beam/strut combination is movable relative to the frame rail 10 along a longitudinal axis of the vehicle. In a typical motor vehicle, a front bumper beam will be mounted to two struts, one attached to each of two longitudinal frame rails at or near the outboard portions of the vehicle body. The longitudinal movement of strut 14 may be achieved, for example, by tracks guide (not shown) mounted between the strut and the frame and using ball bearings, roller bearings, or similar means. Such guide tracks may include features to limit the range of forward/rearward travel of strut 14 relative to frame rail 10.

Strut 14 may be what is known in the vehicle safety industry as a crush can: a hollow, generally tubular member engineered to deform (or crush) under a longitudinal load such as will be applied during a frontal collision with an object. Deformation of the crush can absorbs kinetic energy of the crash and thereby protects occupants of the vehicle from injury.

For simplicity, strut 14 and the corresponding portion of frame 10 are described as being rectangular in cross section. However, a system according to this disclosure may alternatively be practiced in relation to a strut and frame having any other polygonal, circular, or irregular cross section, or an open cross section of any appropriate shape.

Figure 3:
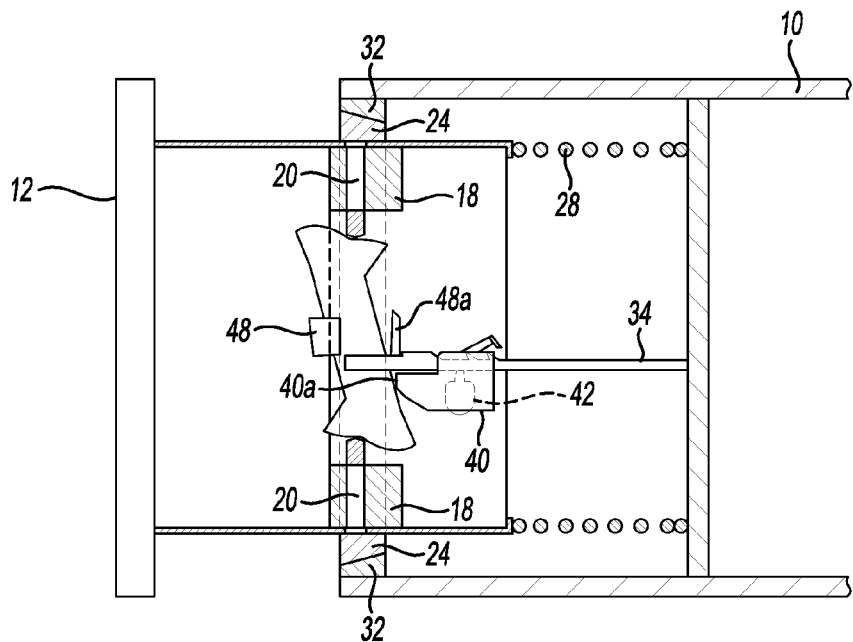
FIG. 3 is a schematic view of the bumper system of FIGS. 1 and 2 after a low energy collision that has not locked the strut against rearward movement.

A support block 18 is secured inside of strut 14 and holds locking members 20 in a manner to permit the locking members to move outwardly relative to the support block and strut. Locking members 20 are mechanically biased inwardly, toward the longitudinal centerline of strut 14, to positions wherein they do not extend past the outer surface of the strut, as seen in FIG. 3. Two locking members 20 are shown symmetrically arranged relative to the longitudinal axis of the strut 14 on upper and lower sides thereof. However, any appropriate number and/or arrangement of locking members may be used.

An engagement block 24 is located adjacent the outer surfaces of strut 14 rearward of locking members 20. Engagement block 24 is mounted to permit rearward longitudinal movement over the outer surface of the strut 14 so long as locking members 20 do not project beyond the outer surface of the strut. The outer, rearward-facing surfaces of engagement blocks 24 are tapered or angled, as shown.

One or more frame blocks 32 are fixed to frame rail 10 at positions corresponding to engagement blocks 24, and project inwardly from the rail. A single, hollow frame block may extend around the inner surface of strut 14. Frame blocks 32 have tapered or angled inner surfaces that oppose the angle formed by the outer surfaces of engagement block 24, as shown.

A guide track 34 and is fixed relative to vehicle frame 10 and extends along the longitudinal axis of the vehicle, which is also the designed impact axis. A central slot 36 (visible in FIG. 4) is formed in at least the forward portion of track 34. One or more saw-tooth-like projections 38 extend from the upper surface of guide track 34.

Figure 4:
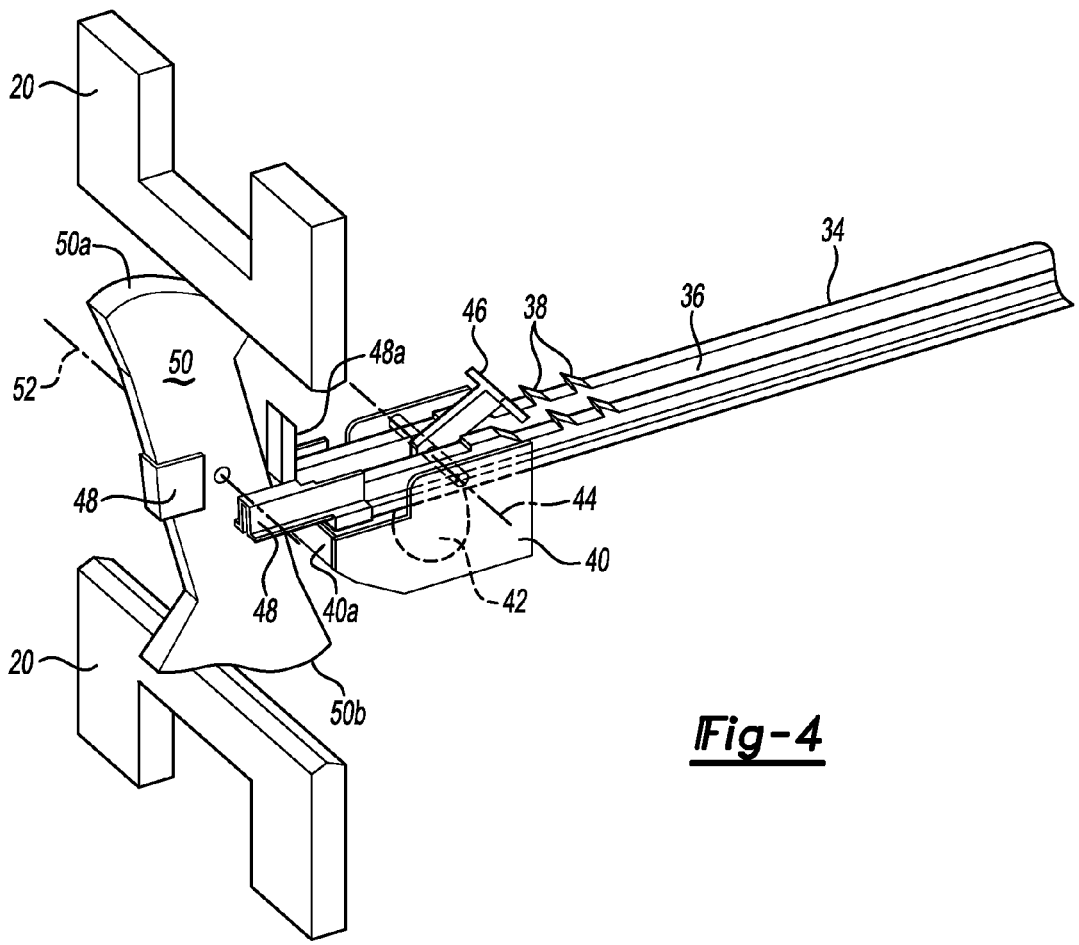
FIG. 4 is a schematic, perspective view of the certain components of the apparatus.
Figure 5:
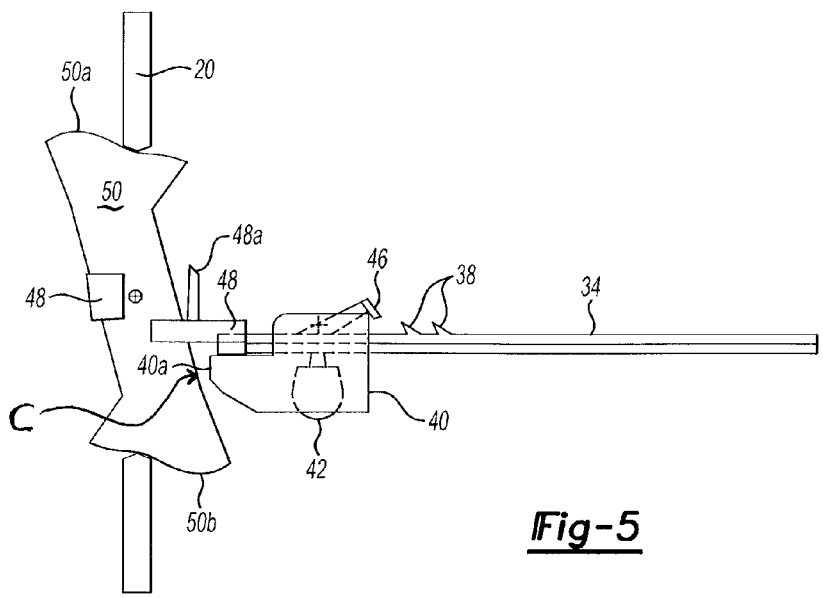
FIG. 5 is a schematic, side view of the apparatus in an un-locked condition.

Referring now to FIGS. 4 and 5, components of the trigger mechanism are seen to include a pendulum housing 40 is supported by guide track 34 for forward/rear movement along the track. A pendulum 42 is suspended within housing 40 for pivoting movement about a pivot axis 44 aligned with the transverse axis of the vehicle. A locking pawl 46 is fixed to pendulum 42 and extends upward and rearward therefrom so that the rearmost end of the locking pawl is forward of and above projections 38.

A cam guide 48 is supported on guide track 34 immediately forward of pendulum housing 40 and is movable longitudinally relative to both the guide track and the pendulum housing. A cam 50 is held by cam guide 48 for pivoting movement about a transverse axis 52. Cam guide 48 comprises a vertical stop 48a located immediately rearward of the rear surface of cam 50 to limit clockwise (as viewed in FIG. 5) rotation of the cam.

Cam 50 has upper and lower contact surfaces 50a, 50b that touch or are immediately proximate to respective locking members 20 when the locking mechanism is in a neutral, pre-impact condition, as best seen in FIGS. 1 and 5.

Figure 7:
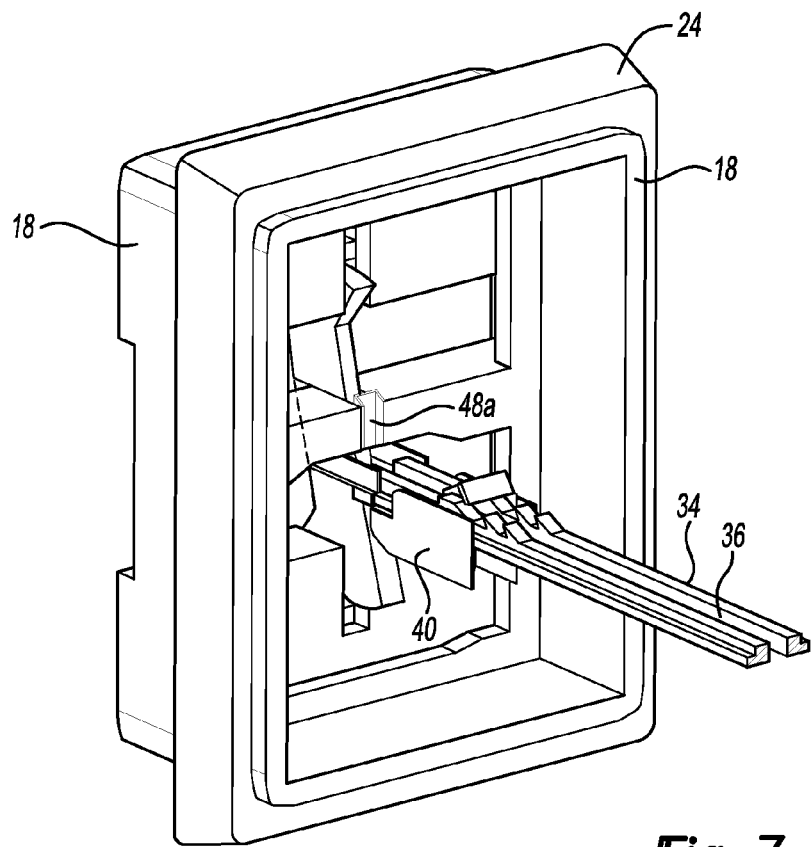
FIG. 7 is a rear perspective view showing the support block, engagement block, and trigger components.
Figure 8:
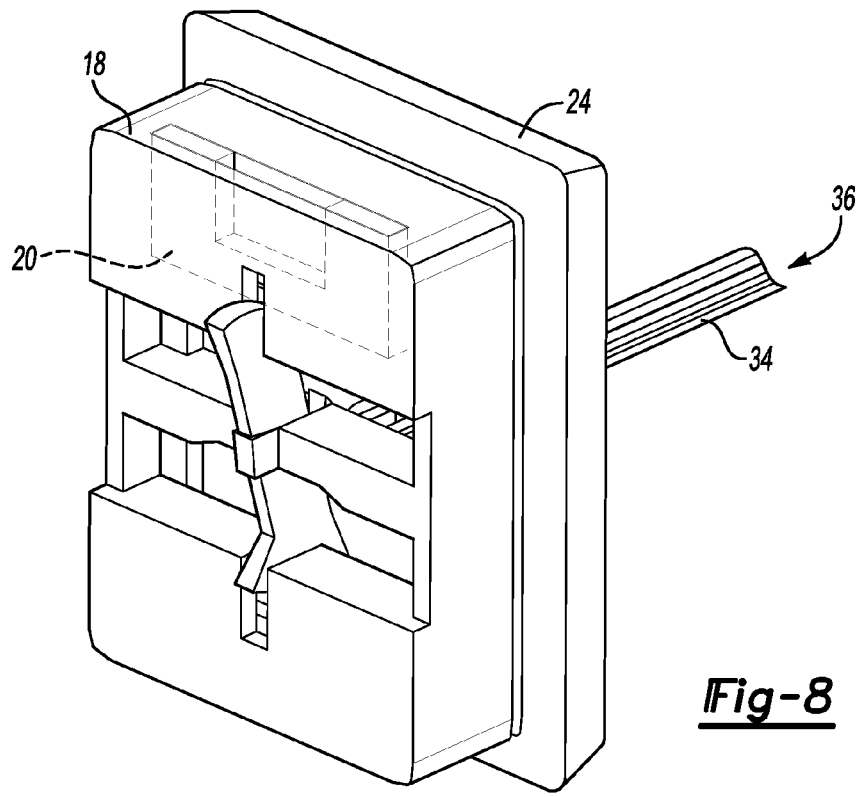
FIG. 8 is a frontal perspective view showing the support block, engagement block, and trigger components.

FIGS. 7 and 8 show rear and front views of the support block 18, engagement block 24, and trigger components. For clarity, strut 14 and frame 10 are not shown in these views. It is to be understood that strut 14 surrounds support block 18 and engagement block 24 surrounds and slides over the outer surface of the strut.

During normal vehicle operation, strut 14 is in the neutral, pre-impact condition shown in FIG. 1 wherein the rear portion of the strut is inside of frame rail 10. Strut 14 is restrained against further forward movement by mechanical engagement between stop features (not shown, for simplicity of the drawings) on the strut 14 and frame 10. A reset spring 28 is uncompressed (or slightly compressed) between frame rail 10 and strut 14 (or support block 18). Inner ends of locking members 20 are lightly contacting (or just clear of) cam contact surfaces 50a, 50b and are spring-biased inwardly relative to strut 14 and support block 18.

In a frontal crash event in which occupant safety dictates that the struts should function to absorb crash energy, the impact on bumper 12 causes the bumper 12, strut 14, support block 18, and associated trigger mechanism components to begin to move rearward relative to frame 10, against the force of reset spring 28. As those components decelerate at the onset of the impact, pendulum 42 swings forward (clockwise as viewed in the present figures) about axis 44 due to inertia. This forward/clockwise pivoting of pendulum 42 rotates locking pawl 46 downward into engagement with teeth 38, locking pendulum housing 40 against further movement rearward along guide track 34.

Figure 6:
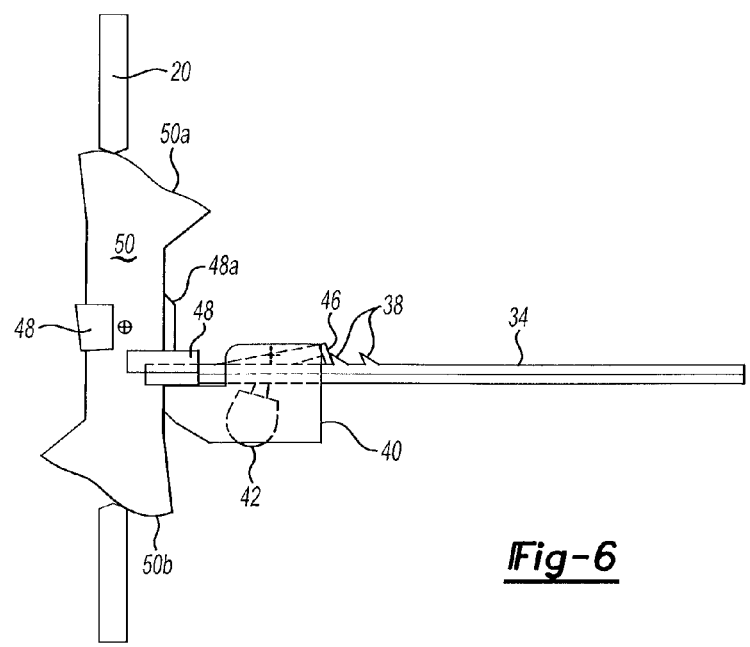
FIG. 6 is a schematic, side view of the apparatus in a locked condition.

When pendulum housing 40 is locked against further movement rearward relative to track 34, cam guide 48 continues to move rearward (relative to pendulum housing 40 and track 34) along with support block 18 and strut 14 so that a forward surface 40a of pendulum housing 40 is urged against cam 50 at the contact location C indicated in FIG. 5. The contact location C is offset from pivot axis 52 so that a small amount of continued rearward movement of cam guide 48 and cam 50 results in pendulum housing 40 acting as an actuator that rotates the cam (clockwise, as viewed FIGS. 1, 2, 5, and 6) to the position shown in FIGS. 2 and 6. The rotation of cam 50 urges locking members 20 outwardly (up and down, respectively, as illustrated in the figures) so that the ends of the locking members project past the outer surfaces of strut 14.

After the small additional amount of bumper/strut movement to the rear, the extended locking members 20 contact the forward faces of engagement block 24 and urges the engagement block rearward (along with strut 14) so that the angled surfaces of the engagement block are driven into wedging contact with frame blocks 32, thereby locking the strut 14 against further rearward movement relative to frame rail 10. In the locked condition, strut 14 may be subjected to a large compressive load and may crumple, if so designed, to manage loads in a high speed crash.

The pre-impact longitudinal gap between locking members 20 and engagement blocks 24 may be selected to permit proper functioning of the bumper system over a range of impact relative velocities (ΔV) between the vehicle and the object being struck by bumper beam 12. In the case where strut 14 is a crush can, for example, the locking member 20/block 24 gap should be large enough to permit the crush can to deform properly at the highest ΔV for which deformation is required.

The degree of deceleration required for inertial movement of pendulum 42 to actuate the trigger mechanism in this manner may be defined as a threshold level. The threshold deceleration level may be selected to distinguish between a relatively high-energy collision in which it is desired for the strut to lock in order to absorb crash energy, and a relatively low-energy collision (such as with a pedestrian), in which it is desired for the strut to remain unlocked and move rearward against spring 28, as shown in FIG. 3.

Referring now to FIG. 3, if the vehicle is involved in a frontal collision with a pedestrian (or any other object that does not subject the vehicle to the threshold level of deceleration during an impact), pendulum 42 does not move forward from its rest state far enough to bring pawl 46 into engagement with projections 38. The trigger mechanism remains unlocked, so that bumper beam 12 and strut 14 are able to move rearward against the force of reset spring 28, thus absorbing a portion of the kinetic energy that would otherwise be applied to the pedestrian, and thereby reducing injury to the pedestrian. The force of reset spring 28 is tuned to properly control the level of deceleration applied to a pedestrian with the aim of reducing injuries.

Pendulum 42 may be biased with a spring or other biasing element (not shown) to resisting forward movement for a particular type of crash. The mass and length of pendulum 42 and the degree of mechanical resistance to motion (due to friction, springs, etc.) are selected such that the pendulum 42 rotates to its locked position (and thereby actuates locking members 20) only when the impact is severe enough that the strut 14 should be used to absorb crash energy for occupant protection. The longitudinal stroking distance of strut 14 is determined based on the front component package and desired energy management of a particular vehicle front-end design to address a range of crash scenarios.

Reset spring 28 can be used for energy management during a pedestrian impact as well as to reset the bumper/strut system back to original, pre-collision position in the event there is no damage to the vehicle front structure. Hence it is possible to provide protection for a pedestrian struck by the vehicle, while also providing the protection for the occupants of a vehicle in a more severe crash. The system may further be tuned to reduce low speed damage in a bumper-to-bumper crash.

If the bumper-crush can system is activated at a low speed without any damage to the system, reset spring 28 returns the system to its original position. In this process, pendulum housing 40 also must return to its original position. This may be achieved in two ways: (1) Cam guide 48 may be attached to pendulum housing 40 in a way that the cam guide can slide along guide track 34 without lateral movement; or (2) Pendulum housing 40 may be connected to cam 50 at a point away from cam pivot axis 52 such that the pendulum housing can travel with bumper system without rotating the cam unless the locking pawl 46 is engaged with the projections 38 of guide track 34.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Front end structure for a vehicle comprising:
   a frame;
   a strut supported by the frame for movement relative thereto along a longitudinal axis of the vehicle;
   a first engagement member movable relative to the strut along the longitudinal axis;
   a second engagement member fixed relative to the frame rearward of the first engagement member;
   a blocking member movable longitudinally with the strut and further moveable relative to the strut between a first position wherein it does not impede rearward movement of the strut relative to the first engagement member, and a second position wherein it prevents rearward movement of the strut relative to the first engagement member such that rearward movement of the strut relative to the frame urges the first engagement member into locking contact with the second engagement member; and
   an inertia-activated trigger mechanism between the strut and the frame, the mechanism including a mass mounted such that deceleration of the strut above a threshold causes an inertial movement of the mass forward relative to the strut, the inertial movement activating the trigger mechanism to a locked condition wherein the trigger mechanism is locked against rearward movement relative to the frame and continued rearward movement of the strut relative to the frame causes the locked trigger mechanism to urge the blocking member to the second position.

2. The apparatus of claim 1 wherein the trigger mechanism further comprises:
   a cam pivotingly mounted to the strut; and
   an actuator that, when the trigger mechanism is in the locked condition, is urged against the cam by rearward movement of the cam and rotates the cam, the rotation of the cam urging the blocking member to the second position.

3. The apparatus of claim 1 wherein the mass is a pendulum pivotable about a transverse axis of the vehicle.

4. The apparatus of claim 1 further comprising a track mounted to the frame and extending along the longitudinal axis, the track supporting the trigger mechanism for longitudinal movement.

5. The apparatus of claim 1 wherein the threshold is set at a level to distinguish between collisions wherein: a) the vehicle strikes a pedestrian; and b) the vehicle strikes an object having greater mass than a pedestrian.

6. The apparatus of claim 1 further comprising:
   a spring disposed between the strut and the frame to apply force resisting movement of the strut rearward relative to the frame.

7. The apparatus of claim 1 wherein at least one of the first and second engagement members is wedge shaped.

8. The apparatus of claim 1 wherein the strut comprises a crush can.

9. Apparatus for mounting a bumper beam to a frame of a motor vehicle comprising:
   a strut having a forward end adapted for attachment to the bumper beam and a rear end adapted for engagement with the frame for rearward movement relative thereto along an impact axis;
   a first engagement member mounted adjacent to the strut and moveable relative thereto along the impact axis;
   a second engagement member fixed relative to the frame rearward of the first engagement member;
   a blocking member mounted to the strut for longitudinal movement therewith and further moveable relative to the strut between a first position wherein it does not impede rearward movement of the strut relative to the first engagement member, and a second position wherein it prevents rearward movement of the strut relative to the first engagement member such that rearward movement of the strut relative to the frame drives the first engagement member into locking contact with the second engagement member;
   a mass mounted between the strut and the frame such that deceleration of the strut above a threshold causes an inertial movement of the mass forward relative to the strut; and
   an actuator locked against rearward movement relative to the frame by the inertial movement of the mass, continued rearward movement of the strut causing the locked actuator to urge the blocking member to the second position.

10. The apparatus of claim 9 further comprising:
   a cam mounted for pivoting movement relative to the strut, the cam being urged against the actuator by the continued rearward movement of the strut to cause rotation of the cam, the rotation of the cam urging the blocking member to the second position.

11. The apparatus of claim 9 wherein the mass is a pendulum pivotable about a transverse axis of the vehicle.

12. The apparatus of claim 9 further comprising a track mounted to the frame and extending along the impact axis, the actuator supported by the track for movement along with the strut.

13. The apparatus of claim 9 further comprising:
   a spring disposed between the strut and the frame to apply force resisting movement of the strut rearward relative to the frame.

14. The apparatus of claim 9 wherein the threshold is set at a level to distinguish between collisions wherein: a) the vehicle strikes a pedestrian; and b) the vehicle strikes an object substantially heavier than a pedestrian.

15. The apparatus of claim 9 wherein at least one of the first and second engagement members are wedge shaped.

16. The apparatus of claim 9 wherein the strut comprises a crush can.

17. Apparatus for selectively preventing rearward movement of a bumper beam strut relative to a vehicle frame along a longitudinal axis comprising:
   a first engagement member mounted adjacent to the strut and moveable relative thereto along the longitudinal axis;
   a second engagement member fixed relative to the frame rearward of the first engagement member;
   a blocking member moveable relative to the strut between a first position wherein it does not impede rearward movement of the strut relative to the first engagement member, and a second position wherein it prevents rearward movement of the strut relative to the first engagement member such that rearward movement of the strut relative to the frame drives the first engagement member into locking contact with the second engagement member;
   a mass movably mounted relative to the strut such that impact deceleration above a threshold applied to the strut causes an inertial movement of the mass forward relative to the strut;
   an actuator having a locked condition wherein it is locked against rearward movement relative to the frame, the inertial movement of the mass causing the actuator to assume the locked condition; and
   a cam that is urged against the actuator by rearward movement of the strut after the actuator assumes the locked condition, the urging against the actuator rotating the cam about an axis normal to longitudinal axis, and the rotation of the cam urging the blocking member to the second position.

18. The apparatus of claim 17 wherein the mass is a pendulum pivotable about a transverse axis of the vehicle.

19. The apparatus of claim 17 further comprising a track mounted to the frame and extending along the longitudinal axis, the track supporting the actuator and the cam for longitudinal movement.

20. The apparatus of claim 17 wherein the strut comprises a crush can.

* * * * *